Mar. 27, 1923.

E. N. LIGHTFOOT 1,449,425

HEATING SYSTEM FOR TYPESETTING MACHINE CRUCIBLES AND THE LIKE

Filed Oct. 10, 1916

Inventor
Edwin N. Lightfoot
By his Attorney

Patented Mar. 27, 1923.

1,449,425

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

HEATING SYSTEM FOR TYPESETTING-MACHINE CRUCIBLES AND THE LIKE.

Application filed October 10, 1916. Serial No. 124,803.

*To all whom it may concern:*

Be it known that I, EDWIN N. LIGHTFOOT, a citizen of the United States of America, and a resident of New York, county of Bronx, and State of New York, have invented certain new and useful Improvements in Heating Systems for Typesetting-Machine Crucibles and the like, of which the following is a specification, reference being had to the accompanying drawings, forming a part thereof.

My invention relates to heating and regulating and control systems and particularly to such as are adapted to automatically govern electric heaters for linotype pots or other typesetting machine crucibles.

One object of my invention is to provide a system for the aforesaid purpose that shall be simple in arrangement and reliable in operation and that shall embody means for automatically governing the amount of heat supplied to the outlet of the crucible independently of the control of the heaters for the body of the crucible.

In linotype crucibles which are provided with body heaters and with mouth and throat or other outlet heaters, the metal in the crucible body is considerably influenced by the heat generated in the mouth and throat heaters. On the other hand, the temperature of the metal in the outlet as it is discharged into the mold, depends not only upon the heat generated in the mouth and throat heaters but also upon the heat generated in the body heaters.

According to my present invention I regulate the heat generated in the mouth and throat heaters in response to the temperature variations near the mouth of the outlet which variations as already explained, are dependent upon both heaters. Furthermore, I prefer to utilize an automatic regulator dependent upon the variations of temperature in the body for independently controlling the heat generated in the body heaters.

In order that my invention may be thoroughly understood, I will now proceed to describe the same in the following specification, and then point out the novel features thereof in appended claim.

Referring to the drawings.

Figure 2:
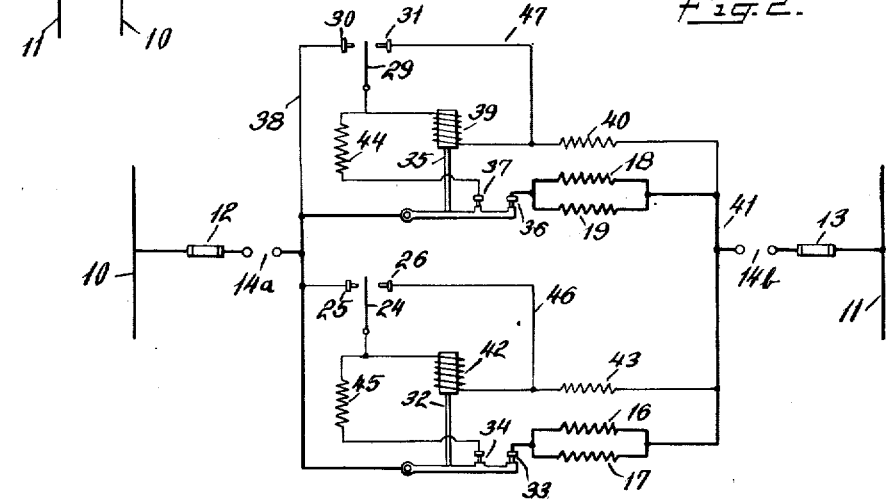
Figure 2 is a simple diagram showing the circuit connections for the two groups of heaters relative to each other.

In the drawings, line conductors 10 and 11 are intended to represent any suitable source of energy, 12 and 13 being the line fuses and 14 the line switch which may conveniently be a snap switch. The poles of this switch are separated in Figure 2, and are marked 14ª and 14ᵇ.

Figure 1:
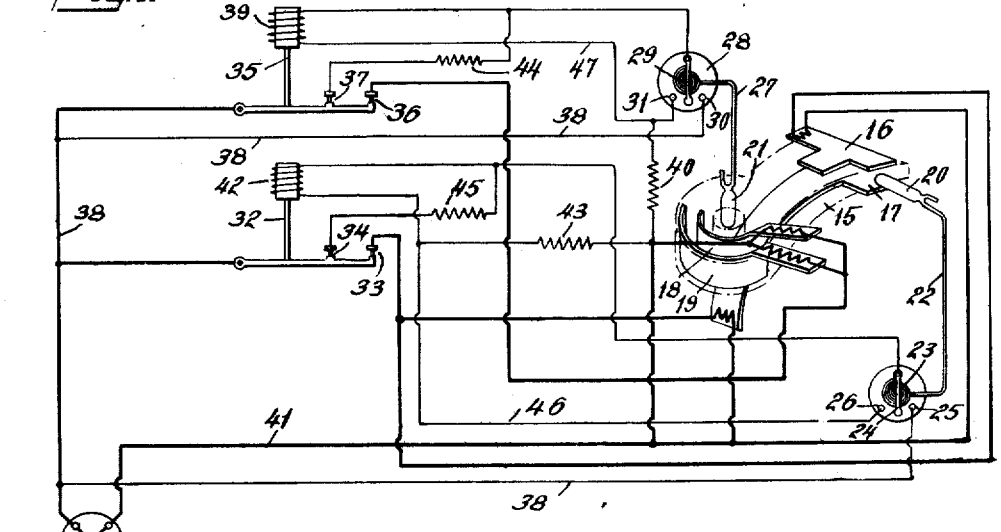
Figure 1 is a diagrammatic view of a heat regulating and control system constituting one embodiment of my invention, the crucible being shown in outline perspective, together with the heating elements and regulating thermometer.

A crucible 15 is shown in broken lines in outline perspective in Figure 1, and is equipped with a mouth heater 16, a throat heater 17 and crucible body heaters 18 and 19. For convenience of illustration the heating elements of the throat and mouth heaters are shown diagrammatically in Figure 1 at the bottom and left respectively of these heaters while the heating elements of the body heaters are shown at the right of their respective heaters. Furthermore a regulating thermometer bulb 20 is disposed at the mouth of the crucible and a second regulating thermometer bulb 21 extends into the body of the crucible.

The thermometer bulb 20 is connected by a tube 22 to a spiral or other suitable actuator 23 connected to a movable contact finger 24. This finger cooperates with one or the other of the stationary contacts 25 and 26, depending upon temperature variations at the outlet of the crucible.

The temperature bulb 21 is similarly connected by a tube 27 to an actuating spiral 28 connected to a movable contact 29, the latter being mounted to make engagement with one or the other of a pair of stationary contacts 30—31.

The contacts 24—25—26 constitute an automatic master switch and govern the action of a control switch 32 which is provided with a pair of main contacts 33 and auxiliary contacts 34.

The contacts 29—30 and 31 similarly govern a control switch 35 which is provided with primary contacts 36 and secondary contacts 37.

The operation and circuit connections of the system are as follows: Assuming that the line switch 14 is open so that control switches 32 and 35 are both open and the heaters deenergized. Under these conditions the contacts 24 and 25 of the thermometer regulator will be in engagement and similarly the contacts 29 and 30 of the other regulator will be in engagement. If, now, the line switch 14 is closed, a circuit connection is first established from line conductor 10, through fuse 12, switch pole 14$^a$, conductor 38, contacts 29 and 30, magnet coil 39 of switch 35, resistance 40, conductor 41, pole 14$^b$ of the line switch, and fuse 13 to conductor 11. A second circuit is similarly established from conductor 38 through contacts 24 and 25, coil 42 of switch 32, and resistance 43 to conductor 41. The coils 39 and 42 are thus both energized and the switches 35 and 32 closed.

When closed, the switch 35 completes a holding circuit for the coil 39 through the auxiliary contacts 37 and resistances 44 and 40. The switch 32 when closed similarly completes a holding circuit through contacts 34 and resistances 45 and 43.

Both switches are now maintained closed independently of the condition of contacts 23—25 and 29—30 respectively, although the control switches are both arranged to be opened when the regulating fingers 24 and 29 engage respectively with the stationary contacts 26 and 31, as hereinafter explained. The closing of the switch 35 completes a main circuit from conductor 38 through contacts 36 and crucible heaters 18 and 19 to conductor 41. The crucible heaters are preferably connected in multiple circuit relation so that if one should fail or become short-circuited, the other will still be available for keeping the metal in the crucible in a molten condition.

The closing of the switch 32 completes another branch of the main circuit from conductor 38 through contacts 33 and the mouth and the throat heaters 16 and 17 which are also preferably connected in multiple circuit relation.

If, while the machine is in operation, a large quantity of metal should be carried over, the temperature of the crucible at the outlet will be materially increased and will influence the thermometer bulb 20, so as to move the finger 24 into engagement with contact 26. When this occurs the coil 42 of switch 32 is short-circuited by conductor 46. The switch 32 is thus opened and the circuit to the mouth and throat heaters temporarily interrupted.

Instead of interrupting this circuit entirely the switch 32 may be shunted by resistance or otherwise arranged to introduce resistance into the circuit to reduce the amount of energy supplied to the heaters instead of cutting it off entirely.

The regulating finger 29 is responsive to variations in the temperature of the metal in the body of the crucible and if this exceeds a predetermined amount, the contacts 29 and 31 come into engagement so as to short-circuit the coil 39 through conductor 47, thereby opening the switch 35, interrupting the circuit and deenergizing the crucible heaters 18 and 19 until the temperature in the metal is reduced.

Attention is particularly directed to the fact that while the branches of the regulating system may be electrically independent of each other they are functionally and actually very closely interdependent because of the fact that the heat generated by one of the heaters has a material influence upon the portion of the crucible which is directly heated by the other heater. In other words, each group of heaters influences not only the adjacent thermometer bulb but also that which is more remote.

The circuit connections for the system may be varied without departing from the spirit and scope of my invention, and I intend that only such limitations be imposed as are indicated in the appended claim.

What I claim is:

The combination with a crucible and throat therefor having body, throat and mouth heaters, of automatic control means for said heaters whereby automatic regulation of the body heater may be effected without regulation of the throat and mouth heaters and vice versa, said means including thermo-responsive devices respectively subjected to the thermal conditions within said apparatus to be heated, at spaced points and respectively controlling different heaters to compensate for varying thermal conditions due to the relative temperatures at such points and to maintain such temperatures at desired and predetermined values.

In witness whereof, I have hereunto set my hand this 6th day of October, 1916.

EDWIN N. LIGHTFOOT.

Witnesses:
G. P. BROCKWAY,
H. J. EULER.